(No Model.)

G. A. LOWRY.
TWINE FOR BINDING GRAIN.

No. 412,963. Patented Oct. 15, 1889.

Witnesses:
M. P. Smith,
R. H. Orwig,

Inventor:
George A. Lowry,
By Thomas G. Orwig, Att'y.

UNITED STATES PATENT OFFICE.

GEORGE A. LOWRY, OF DES MOINES, IOWA, ASSIGNOR OF ONE-HALF TO WILLIAM L. MAY, OF SAME PLACE.

TWINE FOR BINDING GRAIN.

SPECIFICATION forming part of Letters Patent No. 412,963, dated October 15, 1889.

Application filed August 10, 1889. Serial No. 320,373. (No model.)

*To all whom it may concern:*

Be it known that I, GEORGE A. LOWRY, a citizen of the United States of America, and a resident of Des Moines, in the county of Polk and State of Iowa, have invented a new and useful Twine for Binding Grain, of which the following is a specification.

My object is to utilize common farm products—such as grass, hay, and straw—for binding grain; and my invention consists in the construction of a twine, as hereinafter described, that is adapted to be wound upon a ball or spool and used in a grain-binder on a harvester for automatically binding sheaves as the machine is advanced in a field to cut and bind grain in a common way.

Figure 1:
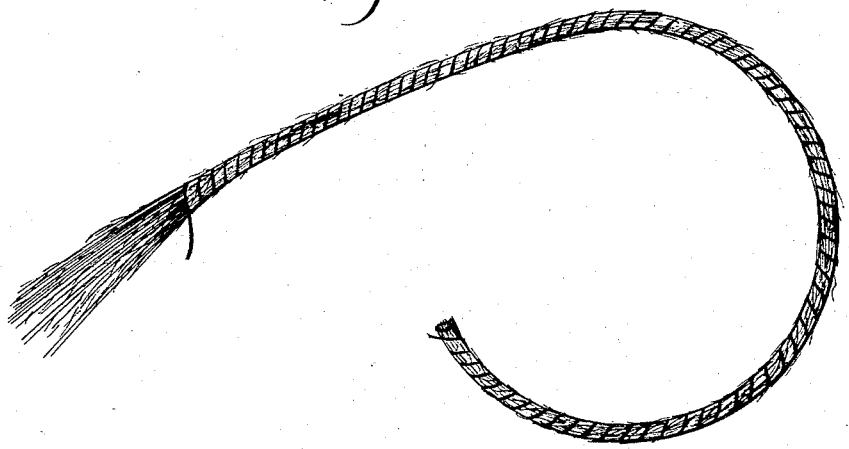
Figure 2:
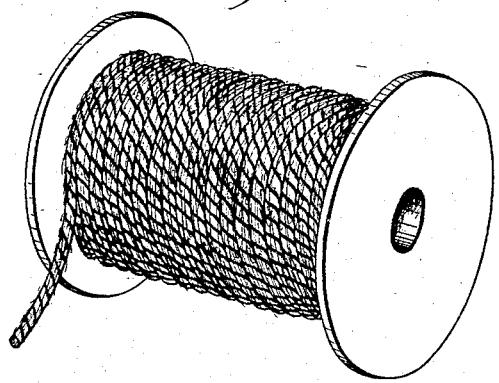

Figure 1 of the accompanying drawings is a perspective view of a piece of my twine, showing the raw material projecting at one end to illustrate the manner of construction. Fig. 2 is a perspective view showing the twine on a spool ready for use.

In the manufacture of my twine I place stems and blades of grass, hay, or straw into parallel position with each other and twist them together, and then wrap a thread of cotton or other suitable material around the outside to prevent any ends from projecting, and to produce and maintain a uniform thickness and smooth surface, as required to adapt the twine to slip through the eye of a needle in a binder.

The raw material or finished twine may be advantageously wet with oil or other liquid adapted to make the material pliable and to preserve its textile strength.

I claim as my invention—

As an improved article of manufacture, a twine made of grass, hay, or straw, twisted together and wrapped with a thread made of cotton or other suitable material, substantially as shown and described, for the purposes stated.

GEORGE A. LOWRY.

Witnesses:
WILLIAM L. MAY,
THOMAS G. ORWIG.